United States Patent [19]

Hanebuth

[11] 4,027,501

[45] June 7, 1977

[54] METHOD FOR JOINING A TIP FOR A FLEXIBLE SHAFT AND ASSEMBLY THEREOF

[75] Inventor: Paul N. Hanebuth, Hendersonville, N.C.

[73] Assignee: Stewart-Warner Corporation, Chicago, Ill.

[22] Filed: Nov. 25, 1974

[21] Appl. No.: 526,878

Related U.S. Application Data

[63] Continuation-in-part of Ser. No. 370,989, June 18, 1973, abandoned.

[52] U.S. Cl. .................................. 64/4; 64/2 R; 29/530; 29/527.1
[51] Int. Cl.² ...................... F16C 1/10; F16C 1/02; F16C 1/08
[58] Field of Search .................. 74/501 R, 501 P; 64/2 R, 4; 264/262, 275, 274, 273; 29/527.1, 530

[56] References Cited

UNITED STATES PATENTS

| | | | |
|---|---|---|---|
| 2,561,351 | 7/1951 | Fentress | 285/169 |
| 3,211,485 | 10/1965 | Petersen | 64/2 R |

*Primary Examiner*—Samuel Scott
*Assistant Examiner*—Frank H. McKenzie, Jr.

[57] ABSTRACT

A method for manufacturing a speedometer flexible shaft assembly in which the shaft has a plastic coupling molded on the end thereof to provide concentricity between the shaft and coupling. The coupling engages in the noncircular opening of a speedometer magnet shaft rotatably supported in the speedometer frame boss to which a shaft casing ferrule is secured. The ferrule carries a washer which rotatably supports the coupling and receives axial thrust forces.

5 Claims, 4 Drawing Figures

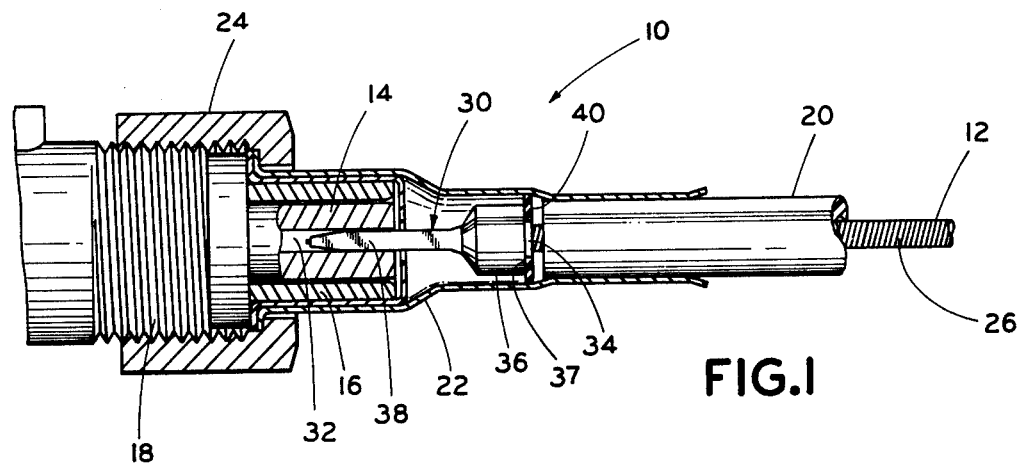
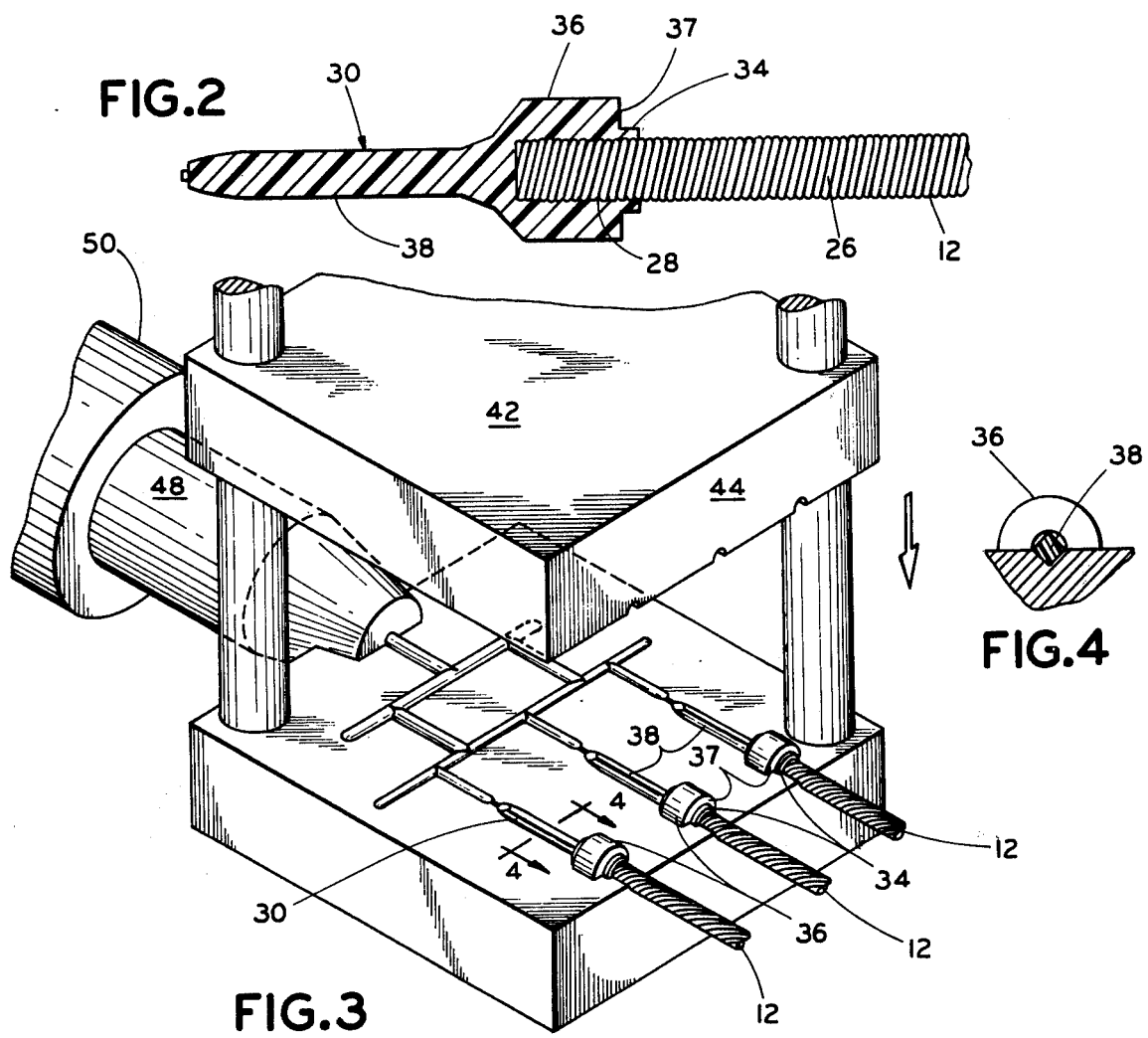

METHOD FOR JOINING A TIP FOR A FLEXIBLE SHAFT AND ASSEMBLY THEREOF

BACKGROUND OF THE INVENTION

1. Field of the Invention

This application is a continuation in part of application, Ser. No. 370,989, now abandoned filed June 18, 1973 and relates in general to flexible shaft assemblies and method for the manufacture thereof and more particularly to a method for making an improved flexible shaft and coupling assembly.

2. Brief Description of the Prior Art

A flexible shaft extends between two rotatable elements for transmitting rotary motion therebetween and is supported or carried by a casing which has a ferrule at each end to fasten each casing end to a fixed support adjacent each shaft end. The shaft end is formed into a squared or noncircular cross section and engaged in a correspondingly shaped recess or opening formed in the respective rotary element to transmit rotary motion from the shaft to the rotary element. The shaft is rotatably supported in the ferrule at the casing end by a bushing, which is crimped on the shaft adjacent the squared end. Since the shaft and bushing are manufactured separately and deformed for assembly, they often will not be concentric, and during rotary operation an undesirable noise is created.

SUMMARY OF THE INVENTION

To provide concentricity between the shaft and coupling, the present invention proposes to avoid the separate manufacture and assembly of the bushing and shaft. Instead, the applicant simply molds a coupling to the shaft end. Since the shaft position is fixed concentrically relative the mold cavity, concentricity between the shaft end and the coupling molded on the shaft end is assured.

It is therefore a primary object of the present invention to provide an improved flexible shaft assembly.

BRIEF DESCRIPTION OF THE DRAWINGS

FIG. 1 is a fragmentary sectional view of one end of a flexible shaft assembly employing the principles of the present invention;

FIG. 2 is an enlarged fragmentary sectional view of the shaft and molded coupling;

FIG. 3 is a largely schematic view of an arrangement for molding a coupling on a shaft end; and FIG. 4 is a fragmentary sectional view taken generally along the line 4—4 in FIG. 3.

BRIEF DESCRIPTION OF ONE EMBODIMENT OF THE INVENTION

FIG. 1 a typical speedometer flexible shaft assembly incorporating the principles of the present invention is indicated generally at 10. The assembly 10 includes a flexible shaft or core 12 for driving or rotating a speedometer magnet shaft, of which a portion is indicated at 14. The magnet shaft 14 is rotatably supported by a bearing 16, which in turn is carried in a typical speedometer externally threaded boss 18.

The flexible shaft assembly 10 includes a casing 20 for carrying shaft 12 and is provided with a ferrule 22 at each end fixed to the casing. The ferrule 22 in turn is fixed to the speedometer boss 18 by means of a nut 24 threaded on the boss to butt the flared end of the ferrule against the boss and secure the casing end to the speedometer. A similar arrangement secures the casing to the housing of the driving element, which is usually located at the vehicle transmission or wheel.

The core 12 comprises a plurality of helically wound wires 26 whose surfaces define interstices 28. The core 12 is sheared to a predetermined length. An axially extending coupling 30 formed of delrin or polyethelene, for example, is molded on the sheared core end for engaging in a noncircular central opening 3 of the shaft 14.

The coupling 30 comprises an annular axially extending rear boss or bearing portion 34 of reduced outer diameter of substantially 0.165 inch encircling the core, a second annular portion 36 encircling the core having an outer diameter of substantially 0.3 inch to form a radial shoulder 37 between portions 34 and 36. The portion 34 has an axial length of substantially 0.04 inch and the portion 36 an axial length of substantially 0.3 inch, and the core 12 extends into the portions 34 and 36 for substantially 0.26 inch. The coupling terminates in an axially extending tip portion 38 of reduced cross section.

The tip portion 38 is of square or noncircular cross section of substantially 0.1 inch on a side for receipt in the correspondingly shaped axially extending recess or hole 32 in the magnet shaft 14 to rotate the shaft 14 in response to rotation of the coupling and core. A thrust washer 40 fixed in the ferrule 22 encircles the hub portion 34 of the coupling to provide rotatable support for the coupling and prevents movement of the coupling from engagement with the magnet shaft.

To mold the coupling to the core, a mold 42 is provided having two complimentary portions 44 and 46 in which respective cavity halves are formed to complete a cavity for a plurality of couplings 30. The cavities have an appropriate gate extending to an injector 48 and heater 50 and the shafts or cores 12 are inserted to an appropriate distance in a correspondingly sized portion of each cavity. The resin forming each coupling is heated and injected through the gates into the coupling cavities to form each coupling around and coaxial with the core portion projecting into the respective cavity with the molded coupling filling the wire interstices 28. The wires 26 forming the outer layer of the core 12 have a diameter of substantially 0.016 inch and the total diameter of core 12 is substantially 0.130 inch. The interstices 28 have a helical configuration with the core being sheared usually by arc cutting to weld the wire ends.

With the descibed molded coupling 30 on the core 12, the coupling 30 is ensured concentricity with the core 12 and when supported by the washer 40 within the ferrule 22, both the coupling and core are in the same axial position relative the ferrule to thereby avoid noise and frictional engagement during the transmission of rotary forces from the core 12 through the coupling 30 to the magnet shaft 14. The wires 26 and interstices 28 extend in the same or clockwise direction as the direction or clockwise rotation of core 12 as seen from the speedometer so that the load of the speedometer tends to increase the coupling binding.

The foregoing dscribes a coupling molded to the end of a flexible shaft whose inventive concepts are believed covered by the accompanying claims.

What is claimed is:

1. A method for ensuring concentricity between a flexible shaft and a coupling, for transmitting rotary motion from said shaft to a magnet shaft rotatably positoned in a speedometer boss, including the steps of forming a flexible shaft, forming a casing for carrying said flexible shaft, forming a ferrule adapted to be fixed to one end of said boss, fixing said ferrule to said boss, forming a noncircular axial passageway in said magnet shaft, and a rigid thrust washer secured in said ferrule, molding a plastic coupling coaxially to one end of said flexible shaft but separate therefrom, simultaneously molding an integral rigid bearing boss on said coupling at one end for rotatable support in said washer, simultaneously molding an integral rigid radial shoulder on said coupling for engagement with said washer to limit movement of said coupling toward said casing, and simultaneously forming a noncircular coaxial projection on said coupling for engagement in said noncircular magnet shaft passageway for rotating said magnet shaft in response to rotation of said flexible shaft.

2. A method for ensuring concentricity between a flexible shaft and a coupling, for transmitting rotary motion from said shaft to a magnet shaft rotatably positioned in a speedometer boss, including the steps of forming a flexible shaft, forming a casing for carrying said flexible shaft, forming a ferrule adapted to be fixed to one end of said boss, fixing said ferrule to said boss, forming a noncircular axial passageway in said magnet shaft, and a rigid thrust washer secured in said ferrule, molding a plastic coupling coaxially to one end of said flexible shaft but separate therefrom simultaneously molding an integral rigid bearing boss on said coupling at one end for rotatable support in said washer, simultaneously molding an integral rigid radial shoulder on said coupling for engagement with said washer to limit movement of said coupling toward said casing, simultaneously forming a noncircular coaxial projection on said coupling for engagement in said noncircular magnet shaft passageway for rotating said magnet shaft in response to rotation of said flexible shaft, forming said shaft by a plurality of helically wound wires defining surface interstices, and forming said coupling so that it extends over said shaft for a distance of substantially 0.26 inch and fills the corresponding surface interstices of said shaft.

3. A method for ensuring concentricity between a flexible shaft and a coupling, for transmitting rotary motion from said shaft to a magnet shaft rotatably positioned in a speedomenter boss, including the steps of forming a flexible shaft, forming a casing for carrying said flexible shaft, forming a ferrule adapted to be fixed to one end of said boss, fixing said ferrule to said boss, forming a noncircular axial passageway in said magnet shaft, and a rigid thrust washer secured in said ferrule, molding a plastic coupling coaxially to one end of said flexible shaft but separate therefrom simultaneously molding an integral rigid bearing boss on said coupling at one end for rotatable support in said washer, simultaneously molding an integral rigid radial shoulder on said coupling for engagement with said washer to limit movement of said coupling toward said casing, simultaneously forming a noncircular coaxial projection on said coupling for engagement in said noncircular magnet shaft passageway for rotating said magnet shaft in response to rotation of said flexible shaft, forming said shaft by a plurality of helically wound wires defining surface interstices, forming said coupling so that it extends over said shaft for a distance of substantially 0.26 inch, filling the corresponding surface interstices of said shaft, forming said coupling boss so that it has an axial length of substantially 0.04 inch and a diameter of 0.165 inch for receipt in a correspondingly sized opening of said washer, and forming said radial shoulder on one end of a coupling portion having an axial length of 0.3 inch and a peripheral diameter of 0.3 inch.

4. A combination, for ensuring concentricity between a flexible shaft and a coupling, for transmitting rotary motion from said shaft to a magnet shaft rotatably positioned in a speedometer boss, the improvement comprising; a flexible shaft, a casing for carrying said flexible shaft, a ferrule fixed to one end of said casing, means fixing said ferrule to said boss, a noncircular axial passageway in said magnet shaft, a rigid thrust washer secured in said ferrule, a plastic coupling molded coaxially to one end of said flexible shaft but separate therefrom and having an integral rigid bearing boss at one end rotatably supported in said washer, an integral rigid radial shoulder on said coupling for engagement with said washer to limit movement of said coupling toward said casing, a noncircular coaxial projection on said coupling for engagement in said noncircular magnet shaft passageway for rotating said magnet shaft in response to rotation of said flexible shaft, said flexible shaft comprising a plurality of helically wound wires defining surface interstices, and said coupling extending over said shaft for a distance of substantially 0.26 inch and fills the corresponding surface interstices of said wires.

5. A combination, for ensuring concentricity between a flexible shaft and a coupling, for transmitting rotary motion from said shaft to a magnet shaft rotatably positioned in a speedometer boss, the improvement comprising; a flexible shaft, a casing for carrying said flexible shaft, a ferrule fixed to one end of said casing, means fixing said ferrule to said boss, a noncircular axial passageway in said magnet shaft, a rigid thrust washer secured in said ferrule, a plastic coupling molded coaxially to one end of said flexible shaft but separate therefrom and having an integral rigid bearing boss at one end rotatably supported in said washer, an integral rigid radial shoulder on said coupling for engagement with said washer to limit movement of said coupling toward said casing, a noncircular coaxial projection on said coupling for engagement in said noncircular magnet shaft passageway for rotating said magnet shaft in response to rotation of said flexible shaft, said coupling bearing boss having an axial length of substantially 0.04 inch and a diameter of 0.165 inch for receipt in a correspondingly sized opening of said washer, and said radial shoulder being formed on one end of a coupling portion having an axial length of 0.3 inch and a peripheral diameter of 0.3 inch.

* * * * *